US008849515B2

(12) United States Patent
Moshchuk et al.

(10) Patent No.: US 8,849,515 B2
(45) Date of Patent: Sep. 30, 2014

(54) STEERING ASSIST IN DRIVER INITIATED COLLISION AVOIDANCE MANEUVER

(75) Inventors: Nikolai K. Moshchuk, Grosse Pointe, MI (US); Shih-Ken Chen, Troy, MI (US); Chad T. Zagorski, Clarkston, MI (US); Aamrapali Chatterjee, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 77 days.

(21) Appl. No.: 13/556,471

(22) Filed: Jul. 24, 2012

(65) Prior Publication Data

US 2014/0032049 A1 Jan. 30, 2014

(51) Int. Cl.
*B62D 6/00* (2006.01)
*B62D 5/00* (2006.01)

(52) U.S. Cl.
USPC .............. 701/42; 701/41; 701/96; 701/302; 340/435; 340/436

(58) Field of Classification Search
CPC .............................. B62D 15/0265; G08G 1/16
See application file for complete search history.

(56) References Cited

U.S. PATENT DOCUMENTS

| | | | | |
|---|---|---|---|---|
| 5,765,116 | A * | 6/1998 | Wilson-Jones et al. | 701/41 |
| 5,870,303 | A * | 2/1999 | Trovato et al. | 700/61 |
| 8,437,890 | B2 * | 5/2013 | Anderson et al. | 701/3 |
| 8,605,947 | B2 * | 12/2013 | Zhang et al. | 382/104 |
| 2004/0090117 | A1 * | 5/2004 | Dudeck et al. | 303/191 |
| 2004/0193351 | A1 * | 9/2004 | Takahashi et al. | 701/70 |
| 2004/0193374 | A1 * | 9/2004 | Hac et al. | 701/301 |
| 2005/0115753 | A1 * | 6/2005 | Pemberton et al. | 180/167 |
| 2005/0216182 | A1 * | 9/2005 | Hussain et al. | 701/200 |
| 2007/0080825 | A1 * | 4/2007 | Shiller | 340/903 |
| 2007/0288133 | A1 * | 12/2007 | Nishira et al. | 701/23 |
| 2008/0046145 | A1 * | 2/2008 | Weaver et al. | 701/41 |
| 2008/0172156 | A1 * | 7/2008 | Joh et al. | 701/45 |
| 2008/0208408 | A1 * | 8/2008 | Arbitmann et al. | 701/41 |
| 2008/0319610 | A1 * | 12/2008 | Oechsle et al. | 701/41 |
| 2009/0099728 | A1 * | 4/2009 | Ichinose et al. | 701/39 |
| 2009/0125225 | A1 * | 5/2009 | Hussain et al. | 701/200 |
| 2009/0322500 | A1 * | 12/2009 | Chatterjee et al. | 340/435 |
| 2010/0030426 | A1 * | 2/2010 | Okita | 701/41 |
| 2010/0274435 | A1 * | 10/2010 | Kondoh et al. | 701/29 |
| 2011/0029235 | A1 * | 2/2011 | Berry | 701/207 |
| 2011/0178710 | A1 * | 7/2011 | Pilutti et al. | 701/301 |
| 2012/0083947 | A1 * | 4/2012 | Anderson et al. | 701/3 |
| 2012/0101713 | A1 * | 4/2012 | Moshchuk et al. | 701/301 |
| 2012/0139715 | A1 * | 6/2012 | Yamazato | 340/436 |
| 2012/0239252 | A1 * | 9/2012 | Sawada et al. | 701/41 |
| 2013/0030651 | A1 * | 1/2013 | Moshchuk et al. | 701/41 |
| 2013/0124041 | A1 * | 5/2013 | Belser et al. | 701/41 |
| 2013/0166150 | A1 * | 6/2013 | Han et al. | 701/42 |

* cited by examiner

*Primary Examiner* — Calvin Cheung
*Assistant Examiner* — Krishnan Ramesh

(57) ABSTRACT

A collision avoidance system for assisting a driver in avoiding a collision between a host vehicle and obstacle. A processor recursively calculates a time-to-collision with the obstacle and an optimal collision avoidance path for avoiding the collision. The optimum collision avoidance path is recursively generated based on a position and speed of the host vehicle relative to the obstacle and an updated calculated time-to-collision. A sensing device determines whether the driver of the vehicle has initiated a steering maneuver to avoid the obstacle. A steering assist mechanism maintains the host vehicle along the optimum collision avoidance path. The steering assist mechanism applies a steering assist torque for producing steering adjustments to assist in guiding the host vehicle along the optimum collision avoidance path to the target lane. The steering assist torque generated by the steering assist mechanism is recursively adjusted based on a recent updated optimum collision avoidance path.

18 Claims, 5 Drawing Sheets

$$h = \frac{h_h + h_f}{2}$$

STEERING ASSIST IN DRIVER INITIATED COLLISION AVOIDANCE MANEUVER

BACKGROUND OF INVENTION

An embodiment relates generally to collision avoidance systems.

Many vehicles are equipped with systems and devices to semi-autonomously or autonomously control a vehicle to avoid a collision or mitigate the severity of a collision. Typical collision avoidance control systems may, for example, provide warning to the driver of when a collision threat exists, enable stability controls, apply differential braking, and/or perform other functions. Collision avoidance systems my use steering in collision avoidance, but such systems generate a collision avoidance plan only from an initial assessment between vehicle and an obstruction.

SUMMARY OF INVENTION

An advantage of an embodiment is to avoid a potential collision with objects in a lane of travel by generating a collision avoidance path. A collision avoidance path is generated and a steering assist mechanism applies a steering assist adjustment torque to maintain the vehicle along the collision avoidance path. Moreover, the collision avoidance path is recursively updated and steering adjustments are made to the steering assist adjustment torque for maintaining the vehicle along an updated collision avoidance path.

An embodiment contemplates a method of assisting a driver in avoiding a collision between a host vehicle and an obstacle in a lane of travel. A collision threat is identified with the obstacle. A time-to-collision is recursively calculated. An optimal collision avoidance path to a target lane for avoiding a collision with the forward driven vehicle is recursively generated. Recursively generating the optimum collision avoidance path is determined by a processor and is based on a position and a speed of the host vehicle relative to the obstacle and an updated calculated time-to-collision. A determination is made whether the driver of the vehicle has initiated a steering maneuver to avoid the obstacle. Steering assist is enabled for maintaining the host vehicle along the optimum collision avoidance path. The steering assist applies a torque by a steering mechanism for producing steering adjustments to assist in guiding the host vehicle along the optimum collision avoidance path to the target lane. The steering assist torque is recursively adjusted by the steering mechanism based on a recent updated optimum collision avoidance path.

An embodiment contemplates a collision avoidance system for assisting a driver in avoiding a collision between a host vehicle and obstacle. A memory retains position and speed of the host vehicle and the obstacle. A processor recursively calculates a time-to-collision with the obstacle. The processor recursively generates an optimal collision avoidance path to a target lane for avoiding a collision with the obstacle. an optimum collision avoidance path is recursively generated based on a position and a speed of the host vehicle relative to the obstacle and an updated calculated time-to-collision. A sensing device determines whether the driver of the vehicle has initiated a steering maneuver to avoid the obstacle. A steering assist mechanism maintains the host vehicle along the optimum collision avoidance path. The steering assist mechanism applies a steering assist torque for producing steering adjustments to assist in guiding the host vehicle along the optimum collision avoidance path to the target lane. The steering assist torque generated by the steering assist mechanism is recursively adjusted the steering assist torque based on a recent updated optimum collision avoidance path.

DETAILED DESCRIPTION

Figure 1:
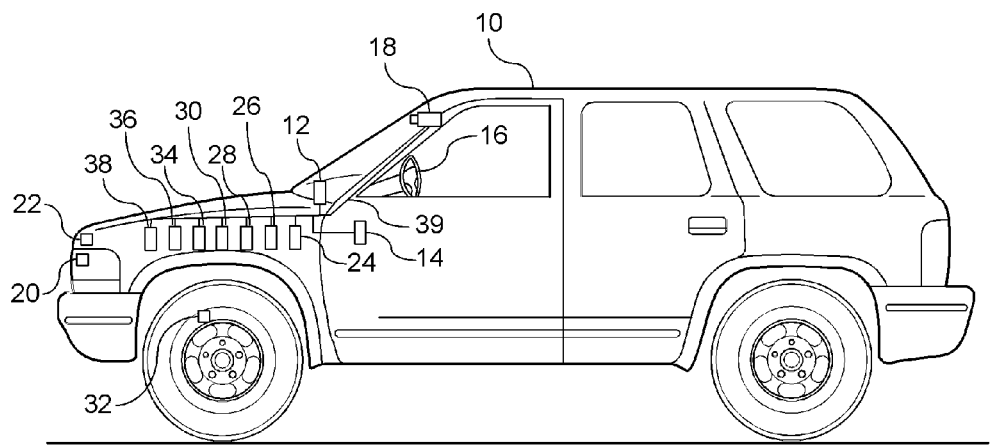
FIG. 1 a schematic diagram of a vehicle with a collision avoidance control system.

A collision avoidance control system may be a semi-autonomous driving system that controls the input to, for example, automated steering, differential braking, automated braking, and/or other systems. The collision avoidance control system may, for example, measure the relative location of objects (e.g., a vehicle, obstacle in the road) with respect to vehicle, e.g., relative to the vehicle (where relative to the vehicle may in some instances mean relative to a specific point within a vehicle, relative to a global positioning system (GPS) system within the vehicle, relative to the center of the vehicle, etc.). If the relative distance between the vehicle and an object is within a predefined distance and the relative velocity of vehicle with respect to the object or other reference is within a predefined value and/or range, a collision avoidance control system may determine that the object poses a collision threat to the vehicle. In response, the collision avoidance control system may output a signal to the driver (e.g., an audible warning), output a command to a braking system to reduce the vehicle speed, output a steering angle command to an automated steering system, or perform other actions.

A first condition may be identified when an object that poses a collision threat to a host vehicle is detected and the collision avoidance control system may first output a signal to the driver. If the driver does not mitigate the collision threat, the collision avoidance control system may control the vehicle to avoid the collision or mitigate the severity of the collision. The collision avoidance control system may output control commands to an automated braking system, automated steering control system, or other system. For example, if the vehicle is too close to the object to drive around the object, automated braking may be employed to mitigate the impact between the vehicle and the object. In some embodiments for some situations, the collision avoidance control system may determine that the vehicle could avoid collision by driving around the object.

A second condition may be identified where the collision avoidance control system may calculate a desired path around the object. To guide the vehicle on the desired path, steering angle control, steering torque control, or other commands may be output to an automated steering control system. The steering angle commands or other commands may be calculated using for example a model-based predictive control (MPC) system based on a 1-track linear bicycle model or other vehicle dynamics model. Known methods such as those disclosed in U.S. patent application Ser. No. 12/399,317, titled "Model Based Predictive Control for Automated Lane Centering/Changing Control Systems", disclose a system and method for providing steering control for lane changing or lane centering purposes in an autonomous or semi-autonomous vehicle system. The model-based predictive control (MPC) system may be a model that describes vehicle motion with respect to a lane, road, or other feature which the vehicle drives upon.

Using, for example, the MPC or another technique, the collision avoidance control system may determine or calculate actuator commands to drive the vehicle to follow a desired path around the object. The desired path around the object may, for example, follow or lie on a smooth curve (e.g., a second order and/or parabolic curve). The desired path may be calculated based on the curvature of the road, other objects in the road, dimensions of the road (e.g., lane widths, shoulder locations, road width, etc.) and/or other factors.

The collision avoidance control system may determine one or more vehicle steering angle control commands, steering torque commands, or other commands to guide the vehicle on the desired path. The collision avoidance control system may, for example, output steering angle control commands, steering torque commands, or other commands to an electrical power steering (EPS), active front steering (AFS), automated steering control system, or other system to guide the vehicle on the path.

The steering angle control commands may, for example, be calculated using the MPC approach with the goal of minimizing deviation from the determined path such as a cost function to calculate steering angle commands. The cost function may be an integral or summation equation whose solution indicates how much the predicted path of a vehicle over a predetermined time period varies from the desired path of the vehicle. The deviation of the vehicle's predicted path from desired path may be calculated, using the cost function, in terms of heading angle error and lateral offset errors between the vehicle desired path and predicted path. The collision avoidance control system may also calculate steering angle command values that minimize the cost function, and thereby compensate for vehicle lateral position and heading angle error between the determined or desired vehicle path and a predicted vehicle path.

The command steering angle or vehicle control parameter values (or predicted vehicle behavior when following control parameter values) may, in some embodiments, be compared to one or more vehicle stability constraints or parameters to ensure that the vehicle control parameter values will not cause the vehicle to become unstable. The vehicle may become unstable, for example, if the tires lose friction (e.g., begin to slide), lateral acceleration exceeds a threshold value, or other vehicle stability constraints are exceeded. In order to ensure vehicle stability, it may be determined whether the vehicle control parameter values (e.g., steering angle command) exceed one or more vehicle stability constraints such as lateral acceleration (or if the control parameter values would result in the vehicle exceeding vehicle stability constraints). If the vehicle control parameter value(s) exceed one or more vehicle stability constraints (or if the control parameter values would result in the vehicle exceeding vehicle stability constraints), the vehicle control parameter value(s) may be reduced or altered to one or more control parameter values not exceeding the one or more vehicle stability constraints. If, however, the vehicle control parameter value(s) do not exceed one or more vehicle stability constraints, the vehicle control parameter values may not be altered, changed, or reduced. While, typically, when parameters are altered, they are reduced to, for example, reduce the forces acting on the vehicle to improve stability, altering parameters may not require reducing parameters.

The collision avoidance control system may compare the one or more command steering angles to lateral acceleration constraints, to determine whether the command steering angle, if output to the automated steering control system, will cause the vehicle to become unstable.

The command steering angle may be used to calculate or predict a vehicle lateral acceleration. The calculated or predicted vehicle lateral acceleration based on the command steering angle may be compared to a threshold or maximum lateral acceleration. If the calculated lateral acceleration exceeds the threshold lateral acceleration, the command steering angle may, for example, be altered or reduced. The command steering angle may be reduced to a value such that the lateral acceleration calculated or predicted using the reduced command steering angle equals the threshold lateral acceleration.

FIG. 1 is a schematic diagram of a vehicle with a collision avoidance control system according to an embodiment of the present invention. A vehicle 10 (e.g., a car, truck, or another vehicle) may include a collision avoidance control system 12. The collision avoidance control system 12 may operate in conjunction with or separate from one or more automatic vehicle control systems, autonomous driving applications or vehicle assist steering systems 14. Vehicle assist steering system 14 may, for example, be or include an adaptive lane centering, low speed lane centering, lane keeping assist, or other application. One or more vehicle assist steering system(s) 14 may be component(s) of system 12, or vehicle assist steering system(s) 14 may be separate from system 12. Vehicle automated steering system 14 may, when engaged, fully or partially control the steering of the vehicle and alter or reduce driver (e.g., operator of the vehicle) steering control input via the steering wheel 16 and/or steering system, which may include an electrical power steering (EPS) system and/or other components.

One or more sensor(s) may be attached to or associated with the vehicle 10. A computer vision sensor (e.g., a camera) 18, LIDAR sensor 20 (e.g., laser radar (LADAR) sensor), radar sensor 22, or other remote sensing device may obtain data allowing system 12 to determine or measure the relative location of the vehicle with respect to road features, for example, other vehicles, lane markers(s), road shoulder(s), median barrier(s), edge of the road and other objects or features. Camera 18 may, for example, measure distance and/or relative orientation to objects, other vehicles (e.g., vehicles in front of vehicle 10 that may pose a collision threat), lane offset, heading angle, lane curvature and provide the information to the vehicle assist steering system 12. Collision avoidance control system 12 may control the steering of vehicle 10 in order to avoid an object (e.g., a vehicle) in front of, in the vicinity of, or otherwise near vehicle 10.

The vehicle 10 may include one or more devices or sensors to measure vehicle steering measurements, vehicle steering conditions, vehicle steering parameters, vehicle dynamics, driver input, or other vehicle related conditions or measurements. The vehicle dynamics measurement device(s) may include one or more steering angle sensor(s) 24 (e.g., connected to steering wheel 16 and/or another component of the steering system). The vehicle dynamics measurement device(s) may also include one or more accelerometer(s) 26, speedometer(s) 28, inertial measurement unit(s) (IMU) 30, wheel speed sensor(s) 32, gear shift position sensor(s) 34, gas pedal position sensor 36, brake pedal position sensor 38, or other devices. The vehicle dynamics measurement device(s) may measure driver input or vehicle dynamics parameters including steering angle, steering torque, steering direction, lateral (i.e., angular or centripetal) acceleration, longitudinal acceleration, yaw-rate, lateral and longitudinal velocity, speed, wheel rotation, and other vehicle dynamics characteristics of vehicle 10. The measured vehicle dynamics, vehicle conditions, steering measurements, steering conditions, or driver input information may be transferred to system 12 via, for example, a wire link (e.g., a controller area network (CAN) bus, Flexray, Ethernet) 39 or a wireless link. The measured vehicle parameters, vehicle conditions, steering measurements, steering conditions, or driver input information data may be used by system 12 or another system to calculate steering angle, steering torque, and other calculations.

The collision avoidance control system 12 may be or may include a computing device mounted on the dashboard of the vehicle, in passenger compartment or in a trunk. In alternate embodiments, collision avoidance control system 12 may be located in another part of the vehicle, may be located in multiple parts of the vehicle, or may have all or part of its functionality remotely located (e.g., in a remote server or in a portable computing device such as a cellular telephone). While various sensors and inputs are discussed, in certain embodiments only a subset (e.g. one) type of sensor or input may be used.

Figure 2:
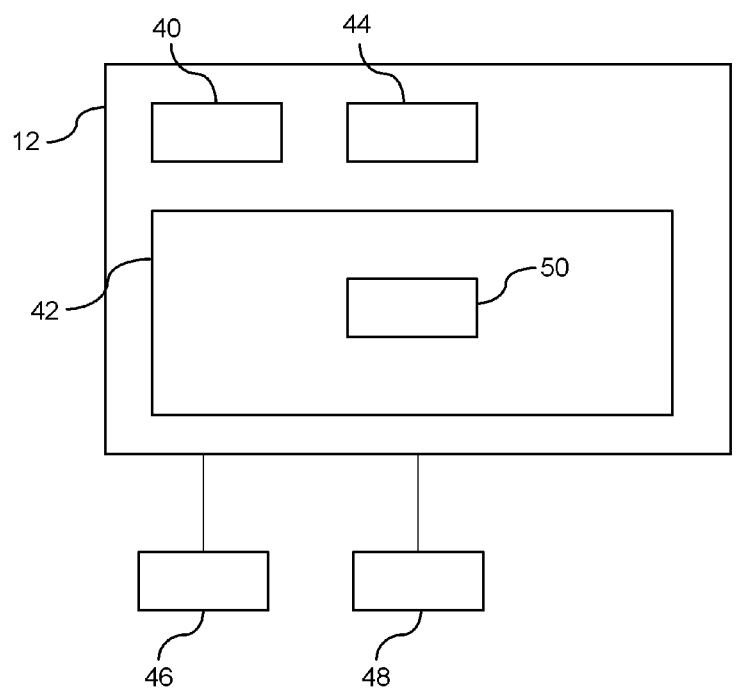
FIG. 2 is a schematic diagram of a collision avoidance control system.

FIG. 2 is a schematic diagram of a collision avoidance control system according to an embodiment of the present invention. Collision avoidance control system 12 may include one or more processor(s) or controller(s) 40, memory 42, long term storage 44, input device(s) 46, and output device(s) 48. Input device(s) 46 may be, for example, a touchscreen, a keyboard, microphone, pointer device, or other device. Output device(s) 46 may be, for example, a display, screen, audio device such as speaker or headphones, or other device. Input device(s) or area(s) 46 and output device(s) 48 may be combined into, for example, a touch screen display and input which may be part of system 12.

System 12 may include one or more databases 50, which may include, for example, control horizon times, prediction horizon time, sample times, sample rates, friction force thresholds, cornering stiffness, surface friction coefficients, vehicle parameter values (e.g. vehicle mass (or mass when empty of passengers, etc.), longitudinal distance from center of gravity of vehicle to front and rear axles), and other information. Databases 50 may be stored all or partly in one or both of memory 42, long term storage 44, or another device.

The processor or controller 40 may include a central processing unit (CPU), a chip or any suitable computing or computational device. Processor or controller 40 may include multiple processors, and may include general-purpose processors and/or dedicated processors such as graphics processing chips. Processor 40 may execute code or instructions, for example, stored in memory 42 or long-term storage 44, to carry out embodiments of the present invention.

Memory 42 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 42 may be or may include multiple memory units.

Long term storage 44 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3:
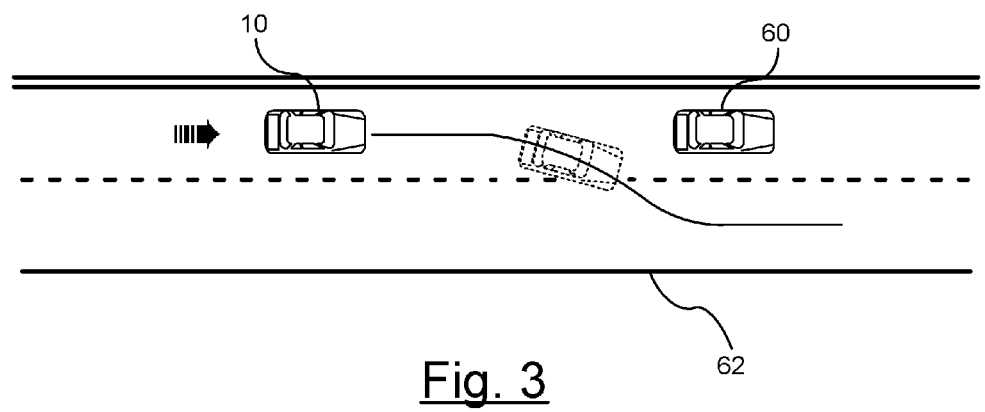
FIG. 3 is a schematic diagram of a collision avoidance control system using steering control

FIG. 3 is a schematic diagram of the collision avoidance control system using steering control. Collision avoidance control system 12 may be passive or operate in the background during normal vehicle operation. System 12 may become active when, for example, vehicle sensor data indicates likelihood of imminent collision, or a collision threat. For example, a vehicle 10 may approach or encounter an object 60 (e.g., a vehicle, stationary object, or other obstacle) in the road 62. If vehicle is within a predefined distance to the object 60 that poses a collision threat, within a predefined velocity range, and within a predefined acceleration range, system 12 or other systems associated with vehicle 10 may provide pre-collision preparation and/or warnings to the driver of vehicle 10. The warnings to driver of vehicle 10 may be a signal, for example, an audible warning, a warning light or other form of warning. If the driver does not mitigate the collision threat, collision avoidance control system 12 may control the vehicle through collision imminent braking, automated steering control, or other controls or maneuvers in order to avoid object 60 or mitigate the impact between vehicle 10 and object 60. Automated braking may include common or typical braking (e.g., applying both front brakes, both rear brakes, or all brakes simultaneously), differential braking (e.g., applying brakes on each wheel independent of other wheel brakes), and/or another braking system or method. Common braking may be used to control a vehicle in a longitudinal direction. Differential braking may, for example, be used to control a vehicle in longitudinal, lateral and other directions.

Figure 4:
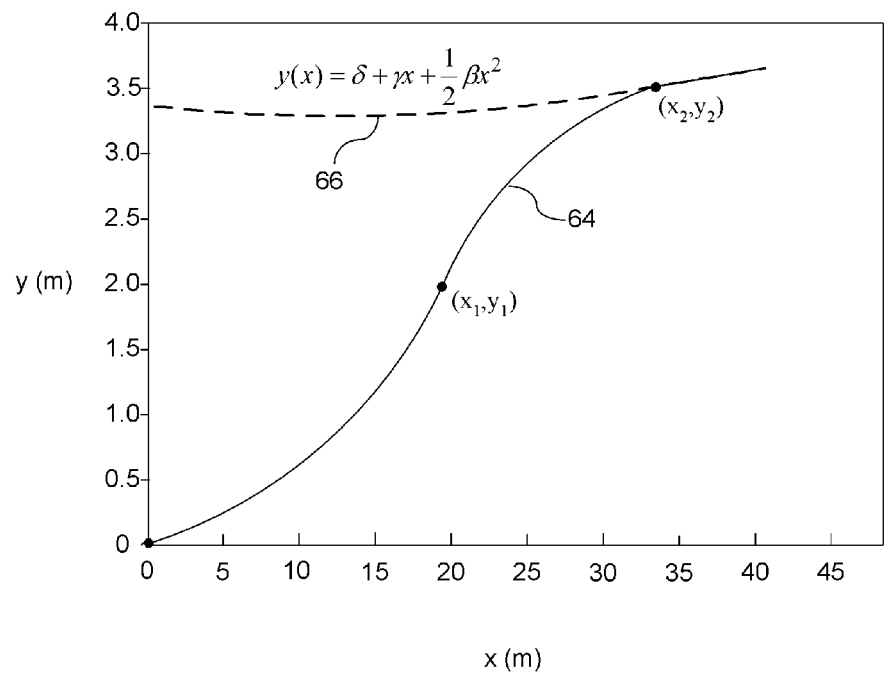
FIG. 4 is a schematic of a quadratic optimum collision avoidance path with no jerk limitations.

During a potential collision threat, a time-to-collision (TTC) is recursively updated. Upon detecting an initiation of an emergency maneuver (i.e., steering maneuver) by the driver to avoid a collision, the TTC is compared to a respective threshold. If the TTC is less than the respective threshold, then the steering assist adjustment system enters a prepare state. An optimal collision avoidance path is determined based on a host vehicle position relative to the forward driven vehicle, vehicle speeds, and steering wheel angle adjustments. The optimum collision avoidance path may be generated with jerk limitations or without jerk limitations. Determining an optimum collision avoidance path with lateral jerk limitations is described in co-pending application Ser. No. 13/222,499 filed on Aug. 31, 2011 which is incorporated by reference in its entirety. A quadratic optimum collision avoidance path with no lateral jerk limitations is shown in FIG. 4. Line 64 represents the optimum collision avoidance path and line 66 represents the target lane. Path parameters are determined as follows:

$$y(x) = \begin{cases} \frac{1}{2}b_1 x^2 + c_1 x, & x \le x_1 \\ \frac{1}{2}b_2(x-x_1)^2 + c_2(x-x_1) + d_2, & x_1 < x \le x_2 \\ \delta + \gamma x + \frac{1}{2}\beta x^2, & x > x_2 \end{cases}$$

and $$b_1 = \frac{a_{ymax}}{V^2};$$

where $a_{y\ max}$ is the maximum lateral acceleration, V is the longitudinal velocity, and δ is a lane offset.

Matching conditions at $x = x_1$:

$$d_2 = \frac{1}{2}b_1x_1^2 + c_1x_1;$$

$$c_2 = b_1x_1 + c_1,$$

$$b_2 = -b_1.$$

Matching conditions at $x = x_2$:

$$\frac{1}{2}b_2(x_2 - x_1)^2 + c_2(x_2 - x_1) + d_2 = \frac{1}{2}\beta x_2^2 + \gamma x_2 + \delta$$

$$b_2(x_2 - x_1) + c_2 = \beta x_2 + \gamma$$

Solutions for $x_1$ and $x_2$:

$$\Delta = \sqrt{\frac{2\delta(b_1 - \beta) + (c_1 - \gamma)^2}{2b_1(b_1 + \beta)}},$$

$$x_1 = \frac{(b_1 + \beta)\Delta + \gamma - c_1}{b_1 - \beta},$$

$$x_2 = x_1 + \Delta.$$

Utilizing the selected technique, the optimal collision avoidance path is recursively updated for determining whether the optimal collision avoidance path should be modified based on vehicle speeds, lateral accelerations, changes in direction by the driver, and changes in position and velocity of the forward driven vehicle. Moreover, various conditions are constantly monitored for either maintaining the steering assist adjustments in the enabled state or for disabling the steering assist adjustments. Various conditions include, but are not limited to, whether the collision avoidance path is feasible, whether the target lane is clear of other objects, whether the driver is overriding the steering assist adjustments, or whether the lateral acceleration is greater than a predetermined threshold.

Figure 5:
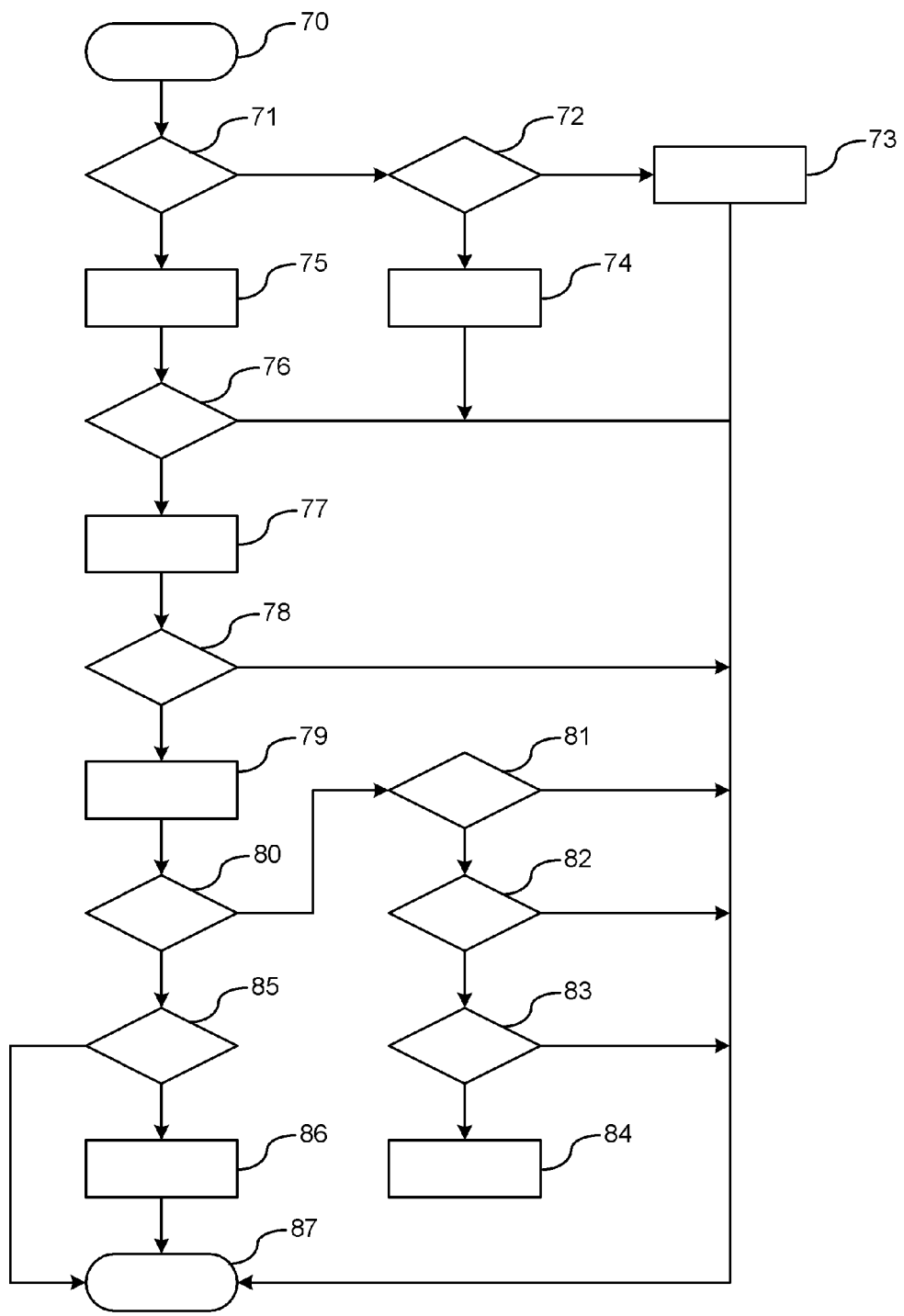
FIG. 5 is a flowchart for applying steering assist.

FIG. 5 illustrates a flowchart for applying the steering assist adjustment technique. In step 70, the routine is initiated. In step 71 a determination is made as to whether the steering assist mode is enabled. If the determination is made that the steering assist mode is enabled, then the routine proceeds to step 72; otherwise the routine proceeds to step 75.

In step 72, a determination is made whether any of the end criteria is satisfied for disabling the steering assist mode. If the determination is made that the end criteria is satisfied, then the routine proceeds to step 73 and the steering assist mode is disabled. The routine then proceeds to step 87 and the routine is exited. In step 72, if the determination is made that the criteria for disabling the steering assist mode is not met, then the routine proceeds to step 74 where path planning and steering assist control continues to avoid a potential collision with the forward driven vehicle.

In step 75, in response to the steering assist mode not being enabled, a first threshold $Th_1$, a second threshold $Th_2$, a third threshold $Th_3$, and steering assist threshold $Th_{SAA}$ are determined. The first threshold $Th_1$ is reached where 90% of drivers will initiate some evasive maneuver including braking and/or steering to avoid colliding with the target vehicle. The second threshold $Th_2$ is reached where 95% of the drivers will initiate hard braking or steering to avoid a collision with the target vehicle. Both $Th_1$ and $Th_2$ may be determined by studying driving behaviors from a significant number of drivers. The third threshold $Th_3$ represents the last chance to avoid the collision by steering only. $Th_3$ may be defined by vehicle dynamics and determined by simulation or vehicle testing.

In step 76, a current time-to-collision estimate (TTC) is compared to the first threshold $Th_1$. If the current TTC estimate is greater than the first threshold $Th_1$, then routine proceeds to step 87 where the routine exits. If the current TTC estimate is less than the first threshold $Th_1$, then routine proceeds to step 77.

In step 77, a collision warning is initiated. The collision warning may be an alert or other collision mitigation device that is enabled.

In step 78, a current time-to-collision (TTC) estimate is compared to the second threshold $Th_2$. If the current TTC estimate is greater than the second threshold $Th_2$, then routine proceeds to step 87 where the routine exits. If the current TTC estimate is less than the second threshold $Th_2$, then routine proceeds to step 79.

In step 79, autonomous collision warning braking is initiated.

In step 80, a determination is made whether the driver has initiated a steering maneuver to avoid the forward driven vehicle. The steering maneuver may be detected by various devices or methods including, but not limited to, a steering wheel angle sensor. If the determination is made the driver initiates a steering maneuver to avoid the forward driven vehicle, then the routine proceeds to step 81; otherwise the routine proceeds to step 85.

Figure 6:
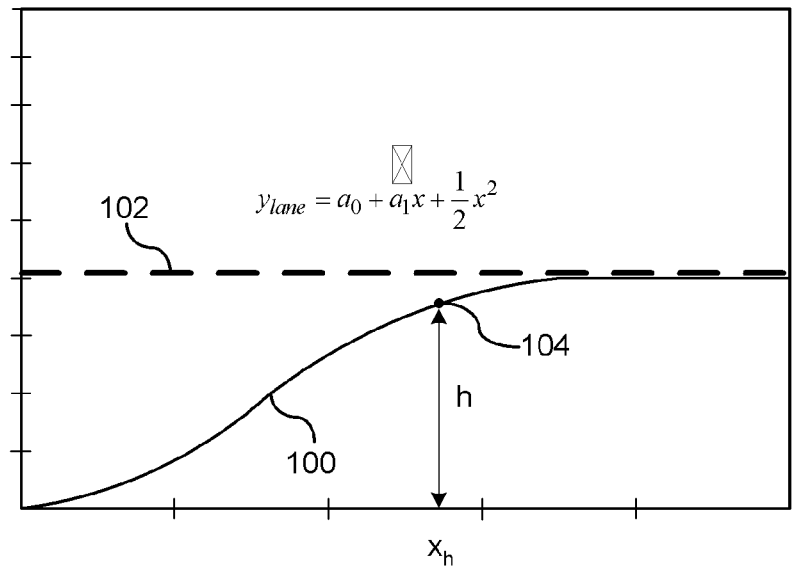
FIG. 6 is a diagram of the optimal curvature avoidance path illustrating parameters of the steering assist threshold $Th_{SAA}$.
Figure 7:
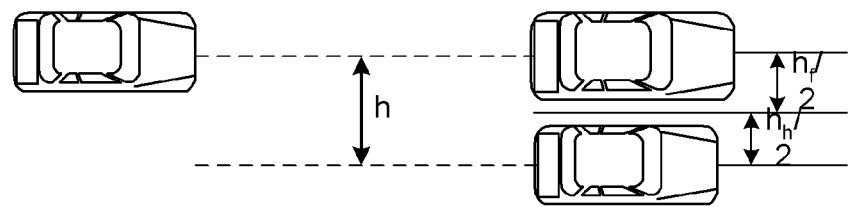
FIG. 7 is a diagrammatic illustration for determining a lateral distance that is used to estimate the steering assist threshold.

In step 81, the TTC is compared to the steering assist threshold $Th_{SAA}$. The steering assist threshold $Th_{SAA}$ represents a time frame which is the last opportunity for the host vehicle to complete a collision avoidance maneuver while the vehicle is exhibiting less than a predefined level of lateral acceleration (e.g., the collision avoidance maneuver may be performed only to a level when less than a maximum allowable lateral acceleration, for example, 0.5-0.6 g, is exerted on the vehicle). The steering assist adjustment threshold is represented by the following formula:

$$TH_{SAA} = x_h/V_x + \tau$$

where $V_x$ is a velocity of the host vehicle, $x_h$ is a distance from the host vehicle to a position along the optimum collision avoidance path in the target lane where the lateral position reaches a width from a centerline of the host vehicle to a centerline of the forward driven vehicle when they are adjacent to one another, and τ accounts for the steering actuator delay. FIG. 6 illustrates a diagram of the optimal avoidance path illustrating how the parameters of the steering assist threshold $Th_{SAA}$ are determined. As shown in FIG. 6, an updated collision avoidance path is represented generally by 100. A target lane is represented by 102. The objective is to maintain the host vehicle along the optimal collision avoidance path to avoid the collision. To avoid the collision, it is determined that the host vehicle must be located at position 104 within a respective time to avoid the collision with the forward driven vehicle. The respective location has a longitudinal distance that is represented by $x_h$ and a lateral distance that is represented by h. The lateral distance h is represented by a width from a centerline of the host vehicle to a centerline of the forward driven vehicle when they are adjacent to one another as depicted in FIG. 7. The formula for determining the lateral distance h is represented by the following:

$$h = \frac{h_h + h_f}{2}$$

wherein h is the distance from the centerline of the forward driven vehicle to the centerline of the host vehicle when the host vehicle and the forward driven vehicle are adjacent to one another, $h_h$ is a width of the host vehicle, and $h_f$ is a width of the forward driven vehicle. As a result, given the calculated lateral distance h, the longitudinal distance $x_h$ may be identified from the graph of FIG. 6. The longitudinal distance $x_h$ is then used to derive the steering assist threshold $Th_{SAA}$.

Referring again to FIG. 5, in step 81, if the steering assist threshold $Th_{SAA}$ is less than the TTC, then the routine proceeds to step 87 and the routine is exited. If the steering assist threshold $Th_{SAA}$ is greater than the TTC, then the routine proceeds to step 82.

In step 82, a determination is made as to whether the steering maneuver utilizing the optimum collision avoidance path is feasible. If unfeasible, then the routine proceeds to step 87 and the routine is exited. If the optimum collision avoidance path is feasible, then the routine proceeds to step 83.

In step 83, a determination is made as to whether an adjacent lane is available to make a lane change. The lane change would involve no obstructions that could hinder a transition from the current lane of travel to an adjacent lane of travel. Objects which may prevent a lane change from occurring could be detected by cameras, sensing devices, or vehicle-to-vehicle communications. If a lane change is unfeasible, then the routine proceeds to step 87 and the routine is exited. If a lane change is feasible, then the routine proceeds to step 84. In step 84, the steering assist mode is enabled for maintaining the host vehicle along the optimum collision avoidance path. During steering assist mode enabled, the optimum collision avoidance path is recursively calculated and steering adjustment is performed by utilizing applied torque from the steering mechanism for maintaining the host vehicle along an updated optimum collision avoidance path. The optimum collision avoidance path is re-calculated at every time step after a driver initiates a steering maneuver. The optimum collision avoidance path is preferably quadratic or cubic and is limited by a predefined range of lateral acceleration.

Various factors will contribute to whether the steering assist mode should be disabled at any time. Such factors include, but are not limited to, whenever a steering maneuver is infeasible, whenever a lane change is infeasible, or whenever the lateral acceleration exceed a predetermined threshold (e.g., 0.5 g-0.6 g).

Figure 8:
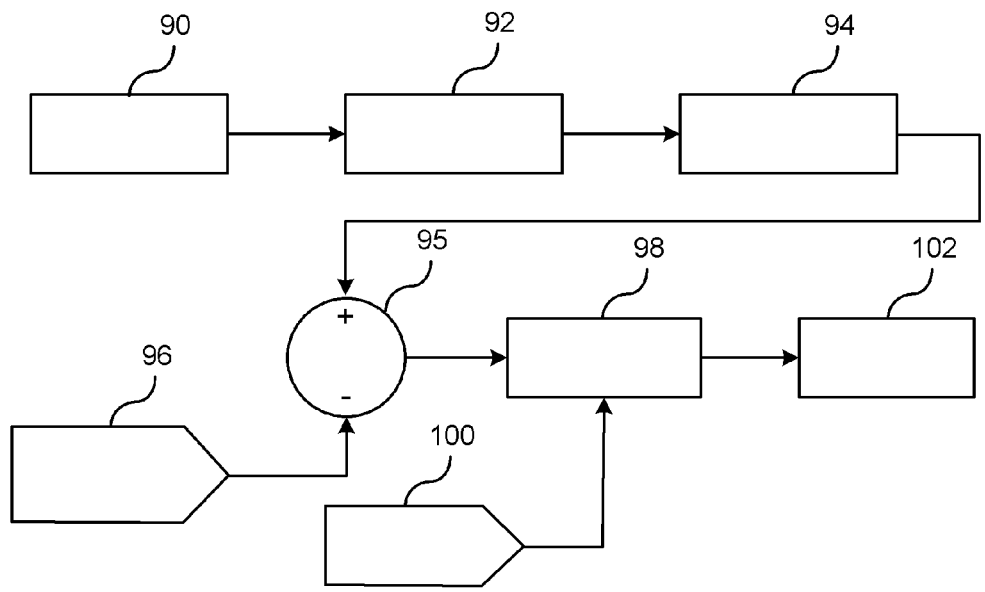
FIG. 8 is a block diagram for determining steering control torque for steering assist.

FIG. 8 illustrates a block diagram for applying steering control to assist the driver maintaining the vehicle along the recalculated optimum collision avoidance path. In block 90, path planning is initiated. Inputs relating to the path planning is applied to the MPC 92 for determining a desired road wheel angle 94 of the host vehicle for maintaining the vehicle on the optimum collision avoidance path. The desired road wheel angle 94 is input to a summation block 95. In addition, a measured or estimated road angle 96 is input to the summation block 95 for determining a difference between the desired road wheel angle and the actual road wheel angle. The determined difference between the desired road wheel angle and the actual road wheel angle from the summation block 95 is applied to a PID controller 98. It should be understood that any other controller that converts a road wheel angle request into corresponding steering torque request can be used here. In addition, a maximum allowable lateral acceleration 100 that is tolerable by the host vehicle for generating the optimum collision avoidance maneuver is provided to the PID controller in block 98. The PID controller 98 outputs a torque command 102 that is applied by a steering mechanism for adjusting the steering angle for maintaining the vehicle along the most updated optimum collision avoidance path.

Referring again to FIG. 5, in step 85, in response to a determination that the driver has not initiated a steering maneuver to avoid the forward driven vehicle, a comparison is made between the TTC and the third threshold $Th_3$. If the TTC is greater than the third threshold $Th_3$, then the routine proceeds to step 87 and the routine is exited. If the TTC is less than the third threshold $Th_3$, then the routine proceeds to step 86.

In step 86, full autonomous collision mitigation braking is applied as it is more advantageous to apply full automated braking to reduce impact speed between the host vehicle and forward driven host vehicle. Steering assist mode remains disabled as the conditions are not present for generating a steering maneuver by the steering assist for avoiding a collision with the forward driven vehicle.

Figure 9:
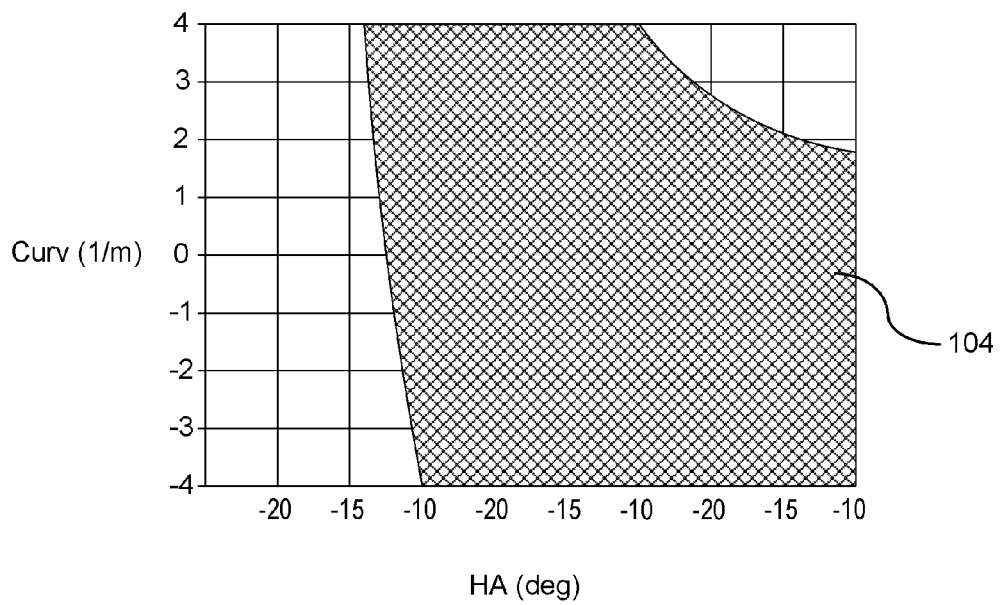
FIG. 9 is an exemplary graph illustrating lateral accelerations as a function of vehicle heading angles and road curvature.

It was described earlier that the lateral acceleration of the vehicle is determined periodically and that the collision avoidance maneuver is not performed when the lateral acceleration is above a respective threshold and the routine is exited. FIG. 9 illustrates a graph of allowable lateral accelerations for a given heading angle and curvature of the vehicle. The x-axis represents the heading angle in degrees and the y-axis represents the lane curvature. A shaded region 104 illustrates feasible lateral accelerations for enabling steering assistance mode or maintaining steering assist mode based on the heading angle and the lane curvature. If the lateral acceleration is outside of the shaded area at any instance of time, the steering assist mode is disabled. It should be understood that the graph shown in FIG. 9 is exemplary and that the acceptable lateral accelerations depicted in the graph may be different based on the vehicle and vehicle dynamics.

While certain embodiments of the present invention have been described in detail, those familiar with the art to which this invention relates will recognize various alternative designs and embodiments for practicing the invention as defined by the following claims.

What is claimed is:

1. A method of assisting a driver in avoiding a collision between a host vehicle and an obstacle in a lane of travel, the method comprising the steps of:

identifying a collision threat with the obstacle;

recursively calculating a time-to-collision;

recursively generating an optimum collision avoidance path to a target lane for avoiding a collision with the obstacle, wherein recursively generating the optimum collision avoidance path is determined by a processor and is based on a position and a speed of the host vehicle relative to the obstacle and an updated calculated time-to-collision;

determining whether the driver of the vehicle has initiated a steering maneuver to avoid the obstacle;

enabling steering assist for maintaining the host vehicle along the optimum collision avoidance path, the steering assist applying a torque by a steering mechanism for producing steering adjustments to assist in guiding the host vehicle along the optimum collision avoidance path to the target lane; and recursively adjusting the steering assist torque by the steering mechanism based on a recent updated optimum collision avoidance path;

wherein a steering assist adjustment threshold is estimated that is a function of a time required for the hose vehicle to move from a current position to the target lane utilizing the optimum collision avoidance path, and wherein a steering assist adjustment threshold is compared to an updated time-to-collision estimation, and wherein the steering assist is enabled as a function of the time-to-collision estimation being less than the steering assist adjustment threshold.

2. The method of claim 1 wherein enabling steering assist for maintaining the host vehicle along the optimum collision avoidance path further includes determining whether the optimum collision avoidance path is feasible, wherein the steering assist torque is recursively adjusted if the optimum collision avoidance path is feasible, and wherein the steering assist is disabled in response to the collision avoidance path being infeasible.

3. The method of claim 1 wherein enabling steering assist for maintaining the host vehicle along the optimum collision avoidance path further includes determining whether the target lane is clear for making a lane change, wherein the steering assist torque is recursively adjusted if the target lane is clear for making the lane change, and wherein the steering assist is disabled in response to the target lane becoming not clear for making the lane change.

4. The method of claim 1 wherein enabling steering assist is based on whether collision imminent braking is initiated by a vehicle control unit, wherein the steering assist is enabled if the collision imminent braking is initiated.

5. The method of claim 1 wherein enabling steering assist for maintaining the host vehicle along the optimum collision avoidance path further includes determining that the driver's self-initiated steering maneuver is insufficient for avoiding the collision based on the optimum collision avoidance path.

6. The method of claim 1 wherein enabling steering assist for maintaining the host vehicle along the optimum collision avoidance path is based on a determination of a lateral acceleration of the vehicle being less than 0.5g.

7. The method of claim 1 wherein steering assist is disabled if the driver overrides the torque applied by the steering assist to the steering mechanism.

8. The method of claim 1 wherein the optimum collision avoidance path includes a lane change to an adjacent target lane, and wherein the steering assist is disabled if the adjacent target lane is unavailable.

9. The method of claim 1 wherein steering assist is disabled when the host vehicle successfully completes a lane change maneuver to the target lane.

10. The method of claim 1 wherein the steering assist adjustment threshold $TH_{SAA}$ is represented by the following formula:

$$TH_{SAA} = x_h/V_x + \tau$$

wherein $V_x$ is a velocity of the host vehicle, $x_h$ is a distance from the host vehicle to a position along the optimum collision avoidance path in the target lane, and $\tau$ is the steering actuator delay.

11. The method of claim 10 wherein the position along the optimum collision avoidance path to the target is a respective distance from a centerline of the obstacle into the target lane.

12. The method of claim 11 wherein distance from the centerline of the obstacle into the target lane is determined by the following formula:

$$h = \frac{h_h + h_f}{2}$$

wherein h is the distance from the centerline of the obstacle into the target lane, $h_h$ is a width of the host vehicle, and $h_f$ is a width of the obstacle.

13. The method of claim 1 wherein the obstacle is a remote vehicle.

14. A collision avoidance system for assisting a driver in avoiding a collision between a host vehicle and obstacle, the system comprising:
a memory for retaining position and speed of the host vehicle and the obstacle;
a processor for recursively calculating a time-to-collision with the obstacle, the processor recursively generating an optimum collision avoidance path to a target lane for avoiding collision with the obstacle, wherein recursively generating an optimum collision avoidance path is based on a position and a speed of the host vehicle to the obstacle and an updated calculated time-to-collision;
a sensing device for determining whether the driver of the vehicle has initiated a steering maneuver to avoid the obstacle; and
a steering assist mechanism for maintaining the host vehicle along the optimum collision avoidance path, the steering assist mechanism applying a steering assist torque for producing steering adjustments to assist in guiding the host vehicle along the optimum collision avoidance path to the target lane;
wherein the steering assist torque generated by the steering assist mechanism is recursively adjusted based on a recent updated optimum collision avoidance path;
wherein a steering assist adjustment threshold by the processor is estimated that is a function of a time required for the hose vehicle to move from a current position to the target lane utilizing the optimum collision avoidance path, and
wherein a steering assist adjustment threshold is compared to an updated time-to-collision estimation, and
wherein the steering assist is enabled as a function of the time-to-collision estimation being less than the steering assist adjustment threshold.

15. The collision avoidance system of claim 14 wherein the steering assist adjustment threshold $TH_{SAA}$ is represented by the following formula:

$$TH_{SAA} = x_h/V_x + \tau$$

wherein $V_x$ is a velocity of the host vehicle, and $x_h$ is a distance from the host vehicle to a position along the optimum collision avoidance path in the target lane.

16. The collision avoidance system of claim 15 wherein the position along the optimum collision avoidance path to the target lane is a respective distance from a centerline of the obstacle into the target lane.

17. The collision avoidance system of claim 16 wherein distance from the centerline of the obstacle into the target lane is determined by the following formula:

$$h = \frac{h_h + h_f}{2}$$

wherein h is the distance from the centerline of the obstacle into the target lane, $h_h$ is a width of the host vehicle, and $h_f$ is a width of the obstacle.

18. The collision avoidance system of claim 14 wherein enabling the steering assist torque for maintaining the host vehicle along the optimum collision avoidance path further includes determining whether the optimum collision avoidance path is feasible, wherein the steering assist torque is recursively adjusted if the optimum collision avoidance path is feasible, and wherein the steering assist torque is disabled in response to the collision avoidance path being infeasible.

* * * * *